Reese Gould & Lake.
Harvester Rake.
No. 2469
Reissued Jan. 29, 1867.
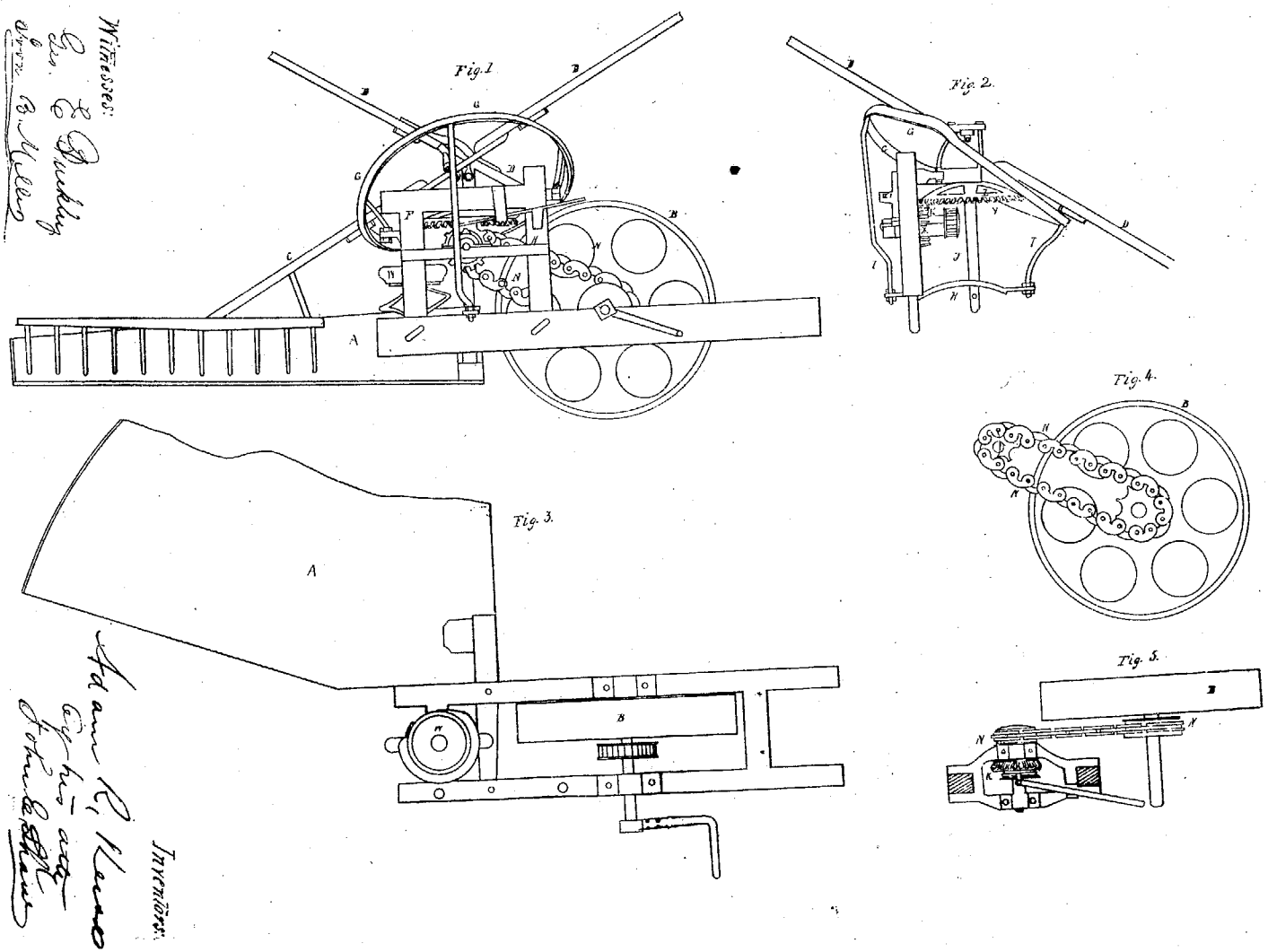
Witnesses:
Geo. E. Dunkley
Orrin B. Milles
Inventors:
Adam R. Reese
by his atty
John E. Shaw

UNITED STATES PATENT OFFICE.

ADAM R. REESE, OF PHILLIPSBURG, NEW JERSEY, ASSIGNEE, BY MESNE ASSIGNMENTS, OF A. R. REESE, W. GOULD, AND N. LAKE.

IMPROVEMENT IN HARVESTER-RAKES.

Specification forming part of Letters Patent No. 33,663, dated November 5, 1861; reissue No. 2,469, dated January 29, 1867.

*To all whom it may concern:*

Be it known that ADAM R. REESE, WILLIAM GOULD, and NELSON LAKE, of Phillipsburg, in the county of Warren and State of New Jersey, did invent a new and useful Improvement in Self-Raking Attachments to Reapers; and that the following is a full, clear, and exact description thereof, reference being had to the annexed drawings, making a part of this specification, in which—

Figure 1 is an elevation of the combined machine. Fig. 2 is an end view of the rake detached. Fig. 3 is a plan of the machine with the rake removed. Fig. 4 is a view of the endless chain and pulleys. Fig. 5 is another view of the same.

The nature of this invention consists in arranging the gearing of the revolving combined self rake and reel within an independent frame, that it may be removed entire and with little trouble from the machine, thereby converting it into a mower, as hereinafter described; and also in the mode of driving the rake-shaft by means of a chain and spur-wheel working into the indentations of said chain.

A is the platform; B, the master-wheel. Fig. 2 is the raking attachment. C is the rake. D D D are the blank heads, which serve to bring the grain upon the platform. The rake and these blank heads thus act as a rake and reel combined. They are constructed and are made to revolve in the ordinary manner. In order that this raking attachment may be conveniently removed from and placed again upon the machine, it is necessary that it should be entirely independent in its construction from the mower. For this purpose a frame, F F, is made, to which the ring G G is attached in any firm manner.

In machines hitherto constructed this ring was stiffened by being braced to the main frame of the machine. Hence, when the raker is taken from the mower, these parts present no firmness.

In this machine the ring is braced to a cross-piece, H, by braces I I. This cross-piece H serves also for one of the bearings of the vertical shaft J. The whole of these parts, therefore, act as supports and braces to each other. For the purpose of regulating the speed of the rake, throwing it in and out of gear, and changing the motion derived from the master-wheel from a vertical to a horizontal motion, as is required by the rake, a small bevel-wheel, K, is placed so as to work into the bevel-wheel L. This wheel, sliding on its shaft, can, of course, be thrown in and out of gear at pleasure. On the same shaft as this beveled wheel K is a tooth-wheel, into which an endless chain, N N, works. This endless chain passes around a similar toothed wheel on the axis of the master-wheel, and thus transmits the motion of the latter to the revolving raker.

The advantage of the use of the chain over the use of gearing, as heretofore has been the custom, is obvious, and as the rake employed by us so revolves as to strike into the grain at an angle other than a right angle to the cutter-bar, if it were not for this chain much complicated machinery would be necessary to drive the rake properly. Owing to the ease with which the chain may be disconnected and adjusted, this mode of driving the rake permits the rake to be more readily detached, and the gearing necessary to drive it being all within the frame F F, the mower, when the rake is removed, is not encumbered with the gearing.

W is a raker's seat or support, which is so placed that when the automatic rake-frame and rake are removed the machine can be used as a hand-raker, if desired, which may oftentimes be desirable in case of derangement of the raking mechanism.

The frame of the rake is fastened to the frame of the mower by pins or other suitable device.

Having thus described the improvements of said REESE, LAKE, and GOULD, what is claimed as their invention is—

1. The combination of an endless chain with a pulley on the main shaft, having projections which enter into the links of the chain, and a corresponding pulley geared to the revolving rake and reel shaft, substantially as described.

2. Supporting the revolving rake and reel upon a detachable frame, so that the entire raking and reeling apparatus can be bodily removed without disarrangement of parts, for the purpose of converting the machine from a reaper to a mower.

3. The combination, with a harvester, of the removable revolving rake and reel frame with the raker's seat or support, so as to give the machine a capacity to be converted from an automatic to a hand raker.

ADAM R. REESE.

Witnesses:
JOHN WHITE,
GEO. E. BUCKLEY.